United States Patent
Arnaudov et al.

(10) Patent No.: US 9,239,841 B2
(45) Date of Patent: Jan. 19, 2016

(54) HASH-BASED SNAPSHOTS

(71) Applicant: VMware, Inc., Palo Alto, CA (US)

(72) Inventors: Antoan Arnaudov, Sofia (BG); Rosen Tomov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 206 days.

(21) Appl. No.: 13/943,717

(22) Filed: Jul. 16, 2013

(65) Prior Publication Data

US 2015/0026132 A1 Jan. 22, 2015

(51) Int. Cl.
*G06F 7/00* (2006.01)
*G06F 17/30* (2006.01)

(52) U.S. Cl.
CPC .... *G06F 17/30097* (2013.01); *G06F 17/30088* (2013.01)

(58) Field of Classification Search
CPC ............ G06F 11/1469; G06F 11/1453; G06F 11/1451; G06F 17/30067; G06F 17/30115; G06F 17/30088; G06F 17/30097; G06F 17/3015; G06F 9/44552; H03M 7/30; H03M 7/3091
See application file for complete search history.

(56) References Cited

U.S. PATENT DOCUMENTS

| | | | | |
|---|---|---|---|---|
| 7,895,666 | B1 * | 2/2011 | Eshghi | G06F 17/30958 705/25 |
| 8,615,489 | B2 * | 12/2013 | Pershin et al. | 707/625 |
| 8,676,759 | B1 * | 3/2014 | Zhu et al. | 707/638 |
| 2003/0046260 | A1 * | 3/2003 | Satyanarayanan et al. | 707/1 |
| 2004/0260973 | A1 * | 12/2004 | Michelman | 714/13 |
| 2006/0123249 | A1 * | 6/2006 | Maheshwari et al. | 713/193 |
| 2007/0209005 | A1 * | 9/2007 | Shaver et al. | 715/733 |
| 2010/0077165 | A1 * | 3/2010 | Lu et al. | 711/162 |
| 2010/0169287 | A1 * | 7/2010 | Klose | 707/692 |
| 2011/0167221 | A1 * | 7/2011 | Pangal et al. | 711/117 |
| 2013/0151562 | A1 * | 6/2013 | Fujii et al. | 707/780 |
| 2013/0173530 | A1 * | 7/2013 | Laron | 707/608 |

OTHER PUBLICATIONS

Trusted VM Snapshots in Untrusted Cloud Infrastures, Srivastava et al, RAID 2012, LNCS 7462, pp. 1-21, 2012.*
"DeviceAnywhere Enterprise Interactive User Guide Release 6.0", Jun. 2013, pp. 1-119, Keynote Systems, Inc., San Mateo, CA.

* cited by examiner

*Primary Examiner* — Augustine K Obisesan

(57) ABSTRACT

Methods and systems configured to provide hash-based snapshot services for a virtual storage are provided. The system includes a processor and memory coupled with the processor. The memory is configured to provide the processor with instructions for maintaining, by a hash-based snapshot module executing on the system, a file system of the virtual storage. The file system is associated with a plurality of data blocks. The virtual storage is supported by a hash-storage having a hash base-file and a hash-database. The hash-database is configured for storing the plurality of data blocks. And the hash base-file includes hash codes generated by applying a hash function to the plurality of data blocks. The memory is further configured to provide the processor with instructions for accessing, by the hash-based snapshot module, the file system using hash codes contained in the hash base-file to identify data blocks stored in the hash-database; creating, by the hash-based snapshot module, a first snapshot for the file system, wherein the first snapshot is associated with a first hash snapshot file copied based on the hash base-file; and accessing, by the hash-based snapshot module, the first snapshot using hash codes contained in the first hash snapshot file to identify data blocks stored in the hash-database.

15 Claims, 6 Drawing Sheets

HASH-BASED SNAPSHOTS

BACKGROUND

In computer systems, a snapshot may be used to preserve a state of a system at a particular point in time. For example, before installing new software to the system, a snapshot may be generated for the system by creating a copy of the data in the system. If the new software installation encounters any problem, the copy of data provided by the snapshot may be used to restore the system back to its original state before the software installation. Once a snapshot is created, additional read/write operations may be recorded in a delta file (or a redo log). Once an initial snapshot is created for the system, subsequent snapshots may also be created for the system to preserve additional states of the system.

In a virtual machine (VM), its virtual storage may be implemented using a single "virtual storage file", and a snapshot of the virtual storage may be created in a form of a "snapshot file." Conventionally, after a snapshot is created, the size of its snapshot file may increase throughout time, as more and more data updates may be recorded in this snapshot file. A large snapshot file may affect the overall performance of the system, as each data read or data write may require the access of the snapshot file and the virtual storage file. Thus, when a snapshot file becomes too big, a conventional "collapsing" operation may be invoked to merge the snapshot file into the virtual storage file. Since the conventional collapsing operation needs apply the updates stored in the snapshot file to the virtual storage file, it requires a large disk space allocation, often takes a long time to finish, and is expensive in terms of CPU and storage resources.

SUMMARY

Methods and systems configured to provide hash-based snapshot services for a virtual storage are provided. The system includes a processor and memory coupled with the processor. The memory is configured to provide the processor with instructions for maintaining, by a hash-based snapshot module executing on the system, a file system of the virtual storage. The file system is associated with a plurality of data blocks. The virtual storage is supported by a hash-storage having a hash base-file and a hash-database. The hash-database is configured for storing the plurality of data blocks. And the hash base-file includes hash codes generated by applying a hash function to the plurality of data blocks. The memory is further configured to provide the processor with instructions for accessing, by the hash-based snapshot module, the file system using hash codes contained in the hash base-file to identify data blocks stored in the hash-database; creating, by the hash-based snapshot module, a first snapshot for the file system, wherein the first snapshot is associated with a first hash snapshot file copied based on the hash base-file; and accessing, by the hash-based snapshot module, the first snapshot using hash codes contained in the first hash snapshot file to identify data blocks stored in the hash-database.

DETAILED DESCRIPTION

Figure 1:
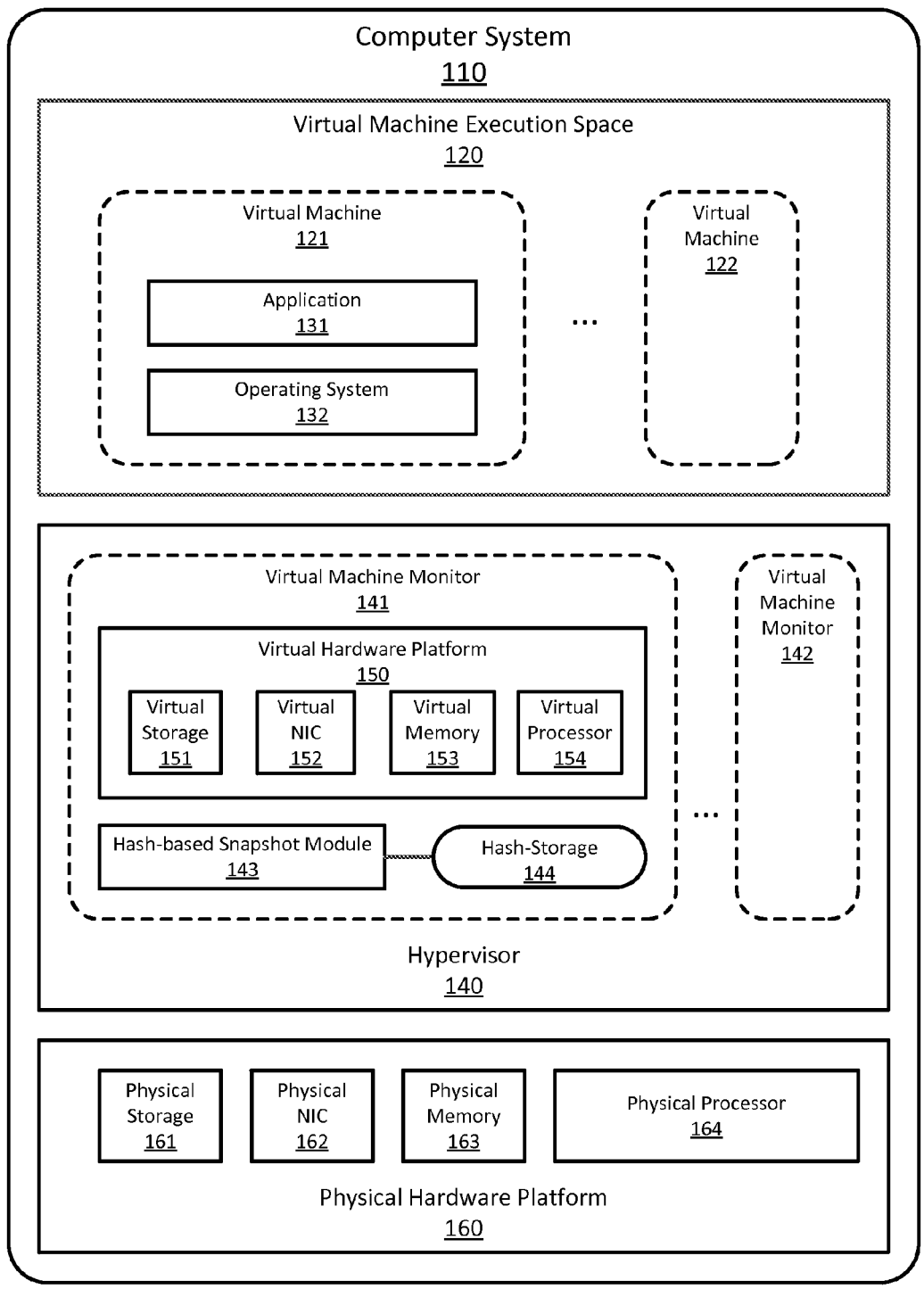
FIG. 1 illustrates a block diagram of a virtualized computer system that can be utilized to implement hash-based snapshots, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a virtualized computer system that can be utilized to implement hash-based snapshots, according to one or more embodiments of the present disclosure. In FIG. 1, a computer system 110 may be constructed based on a desktop, laptop, or server-grade hardware platform 160 (e.g., an x86 architecture platform). The hardware platform 160 may include, without limitation, a physical storage 161 (e.g., a hard drive), a physical network adapter (NIC) 162, physical memory 163, and one or more physical symmetric multi-core processor 164. The hardware platform 160 may contain additional components, such as, without limitation, a mouse and keyboard (not shown in FIG. 1). During run time, multiple symmetric multi-core processors 164 may operate concurrently and may read and write to any portion of the physical memory 163 and the physical storage 161.

In one embodiment, a virtualization software layer, or a hypervisor 140, may be implemented based on the hardware platform 160. The hypervisor 140 may support a virtual machine execution space 120 within which one or more virtual machines (VMs) may be concurrently instantiated and executed. As shown in FIG. 1, the virtual machine execution space 120 may include VMs 121-122. For a specific VM (e.g., VM 121), the hypervisor 140 may provide a corresponding virtual hardware platform (e.g., the virtual hardware platform 150) dedicated to provide virtualized hardware services to the specific VM. In other words, the virtual hardware platform 150 may contains virtual hardware components such as, without limitation, virtual storage 151, virtual NIC 152, virtual memory 153, and one or more virtual processors 154. These virtual hardware components may emulate corresponding physical hardware components similar to the ones in the physical hardware platform 160. In one embodiment, the virtual hardware platform 150 may function as an equivalent of a standard x86 hardware architecture, and may support operating systems such as, without limitation, Microsoft Windows®, Linux®, Solaris® x86, NetWare, FreeBSD.

In one embodiment, after the VM 121 is created in the virtual machine execution space 120, an operating system 132 may be installed in the VM 121 to execute and support applications such as application 131. The operating system 132 may include device drivers that can interact with the virtual hardware components of the virtual hardware platform 150 as if these virtual hardware components were actual physical hardware components. The hypervisor 140 may be configured to process requests received from the operating system 132, its device drivers, and/or applications 131. The hypervisor 140 may also be responsible for transforming requests intended for the virtual hardware components into corresponding requests for the physical hardware components of the hardware platform 160.

It should be recognized that the various terms, layers and categorizations used to describe the virtualization components in FIG. 1 may be referred to differently without departing from their functionalities or the spirit and scope of the present disclosure. For example, the virtual hardware platform 150 may be considered to be part of one or more virtual machine monitors (VMMs) 141-142 which implement the virtual system supports needed to coordinate operations between the hypervisor 140 and the VMs 121-122. Alternatively, the virtual hardware platform 150 may also be considered to be separate from the VMMs 141-142, and/or the VMMs 141-142 may be considered to be separate from the hypervisor 140. It should further be recognized that other virtualized computer system architectures may be used along with the teachings herein. For example, the hypervisor 140 may be designed to run on top of an operating system that can directly access the physical hardware platform 160. The hypervisor 140 may also utilize a shared storage array network (SAN) to support the VMs 121-122.

In one embodiment, the VMM 141 may contain a hash-based snapshot module 143 configured to provide hash-based snapshot services to the virtual storage 151 and the VMs 121-122. The hash-based snapshot module 143 may utilize a hash-storage 144 to store data related to the hash-based snapshot services. For example, when a snapshot is created based on the virtual storage 151, the data contained in the virtual storage 151 may be processed by the hash-based snapshot module 143 into hash codes. The hash codes may then be stored in a snapshot file associated with the snapshot. Thus, the hash version of the snapshot file may be hundreds times smaller than a conventional snapshot file. As a result, the performance of the many snapshot operations, such as the collapsing of a hash-based snapshot, may be better than similar snapshot operations performed on a conventional snapshot. The details of the hash-based snapshot module 143 as well as the hash-storage 144 may be further described below.

Figure 2:
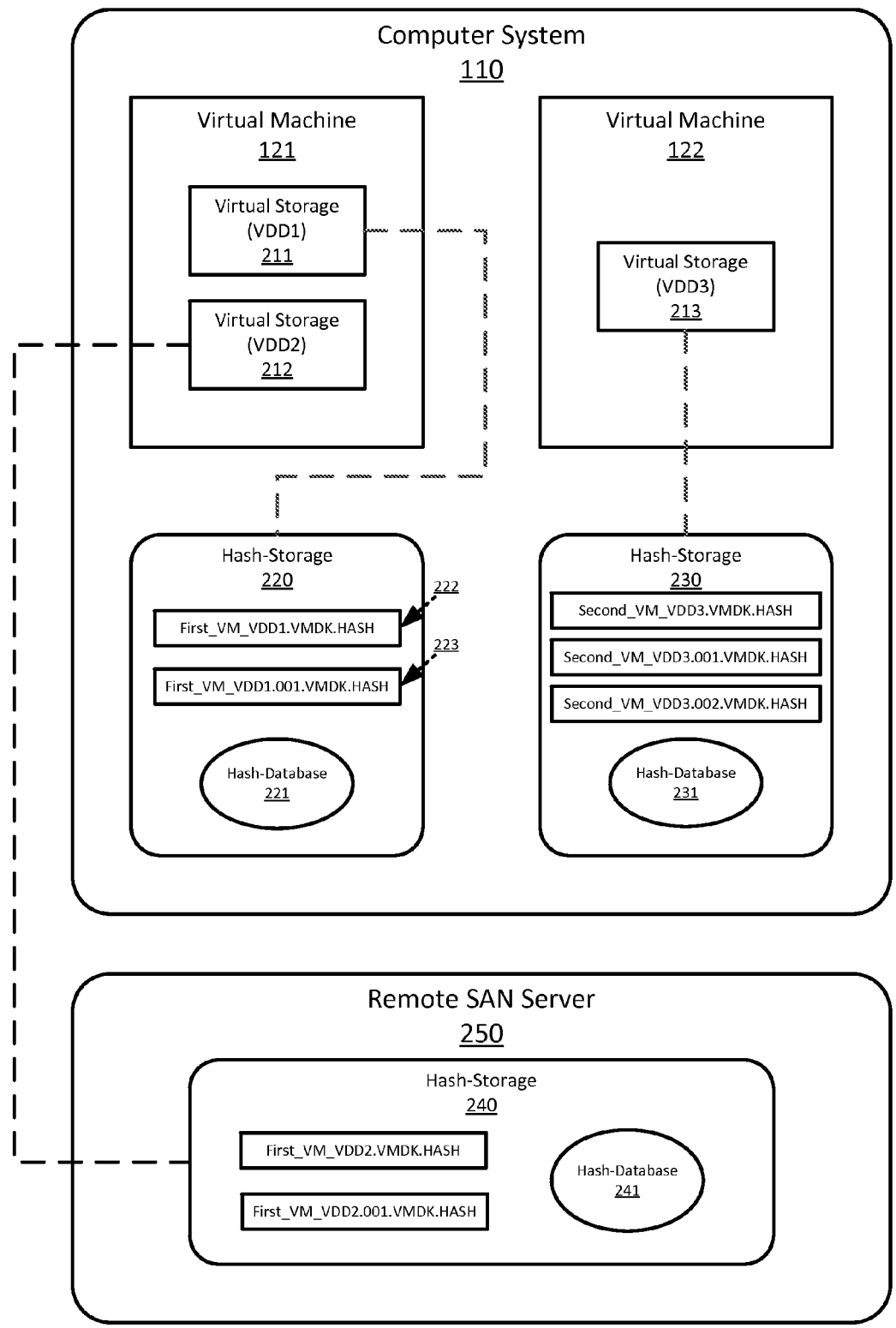
FIG. 2 illustrates a block diagram of a virtualized machine environment that implements multiple hash-based snapshots, according to one or more embodiments of the present disclosure.

FIG. 2 illustrates a block diagram of a virtualized machine environment that implements multiple hash-based snapshots, according to one or more embodiments of the present disclosure. In FIG. 2, the computer system 110 and the VMs 121-122 may correspond to their respective counterparts in FIG. 1. Specifically, the first VM 121 ("First_VM") may contain a virtual storage 211 ("virtual disk drive 1" or "VDD1") and a virtual storage 212 ("VDD2"). The second VM 122 ("Second_VM") may contain a virtual storage 213 ("VDD3"). The hash-storages 220, 230, and 240 may be configured to support hash-based snapshots for the VDD1 211, VDD2 212, and VDD3 213, respectively. Further, the hash-storage 220 and the hash-storage 230, which may be similar to the hash-storage 144 of FIG. 1, may be located in the computer system 110. In comparison, a remote Storage Area Network (SAN) Server 250 may provide network-based storage services to the computer system 110, and may be configured to provide the hash-storage 240.

In one embodiment, a hash-based snapshot module (similar to the hash-based snapshot module 143 of FIG. 1, not shown in FIG. 2) may be configured to provide hash-based snapshot services for the VDD1 211, VDD2 212, and the VDD3 213. The hash-based snapshot module may also utilize one or more local and remote hash-storages to support the virtual storages. Further, a single hash-storage, which may be located locally or remotely with respect to a VM, may be configured to support multiple virtual storages that are installed in multiple VMs. For example, a single hash-storage may concurrently support one virtual storage from a first local VM, two virtual storages from a second local VM, and three virtual storages from a remote SAN server.

In one embodiment, before any snapshot is created for a virtual storage (e.g., VDD1 211), a hash-storage (e.g., hash-storage 220) may contain a "hash base-file" 222 and a "hash-database" 221 for supporting the storage needs of the virtual storage. Specifically, the VDD1 211 may contain a set of data blocks, and the hash base-file 222 may contain a set of hash entities each of which is associated with a specific data block in the VDD1 211. The hash-database (e.g., hash-database 221) may utilize a lightweight embedded database application (e.g., BerkeleyDB®) to provide high performance single-data-block operations. In one embodiment, the hash-database 221 may provide a native interface directly accessible by a hypervisor (not shown in FIG. 2) operating in the computer system 110.

In one embodiment, during an initiation process, the hash-based snapshot module may populate the set of hash entities in the hash base-file 222 with hash codes generated by applying a hash function to the set of data blocks in the VDD1 211. The hash-based snapshot module may then store data contained in the set of data blocks to the hash-database 221. Using the hash codes generated by the hash function, the hash-based snapshot module may associate the set of hash entities in the hash base-file 222 with the data stored in the hash-database 221. Afterward, the hash-based snapshot module may use these hash codes to locate the VDD1 211's data in the hash-database 211. In other words, the hash-based snapshot module may store the VDD1 211's data in the hash-database 221, and store the mechanisms (e.g., associations using hash codes) to locate the VDD1's data in the hash-database 221 in the hash base-file 222.

In one embodiment, the hash-based snapshot module may create a hash-based snapshot for the VDD1 211. The created hash-based snapshot may be in a form of a "hash snapshot file" 223, which may be quickly created by copying the hash base-file 222. Similar to the hash base-file 222, the hash snapshot file 223 may contain a set of hash entities initially copied from the hash base-file 222. In a similar fashion, the hash-based snapshot module may create a "second hash snapshot" based on a "first hash snapshot." That is, the hash-based snapshot module may use a copy of the first hash snapshot's "hash snapshot file" as the second hash snapshot's "hash snapshot file." Thus, the hash-storage 220 may contain from zero to many hash snapshot files.

In one embodiment, since the VDD1 211's data is not stored in the hash base-file 222 or any of the hash snapshot files, many of the snapshot operations may be performed without involving the moving and duplicating of the VDD1 211's data in the hash-database 221. In comparison, a conventional snapshot may be created by storing storage data in a conventional snapshot file. As a result, many of these snapshot operations performed on the conventional snapshot may require the moving and duplicating of the storage data in the conventional snapshot file. Thus, operations based on a hash-based snapshot may have a higher performance than operations utilizing a conventional snapshot.

In FIG. 2's example, the hash-storage 230 may contain a hash base-file ("Second_VM_VDD3.VMDK.HASH") for the VDD3 213 of the VM 122. In addition, the hash-storage 230 may contain two hash-based snapshots implemented using two hash snapshot files "SECOND_VM_VDD3.001.VMDK.HASH" and "SECOND_VM_VDD3.002.VMDK.HASH". Similarly, the hash-storage 240 may be configured for storing a hash base-file "First_VM_VDD2.VMDK.HASH" for the VDD2 212 of the VM 121, as well as a snapshot file "FIRST_VM_VDD2.001.VMDK.HASH" for a snapshot created based on the VDD2 212. The details about the hash-storage, the hash base-file, the hash snapshot file, as well as the hash-database are further described below.

Figure 3:
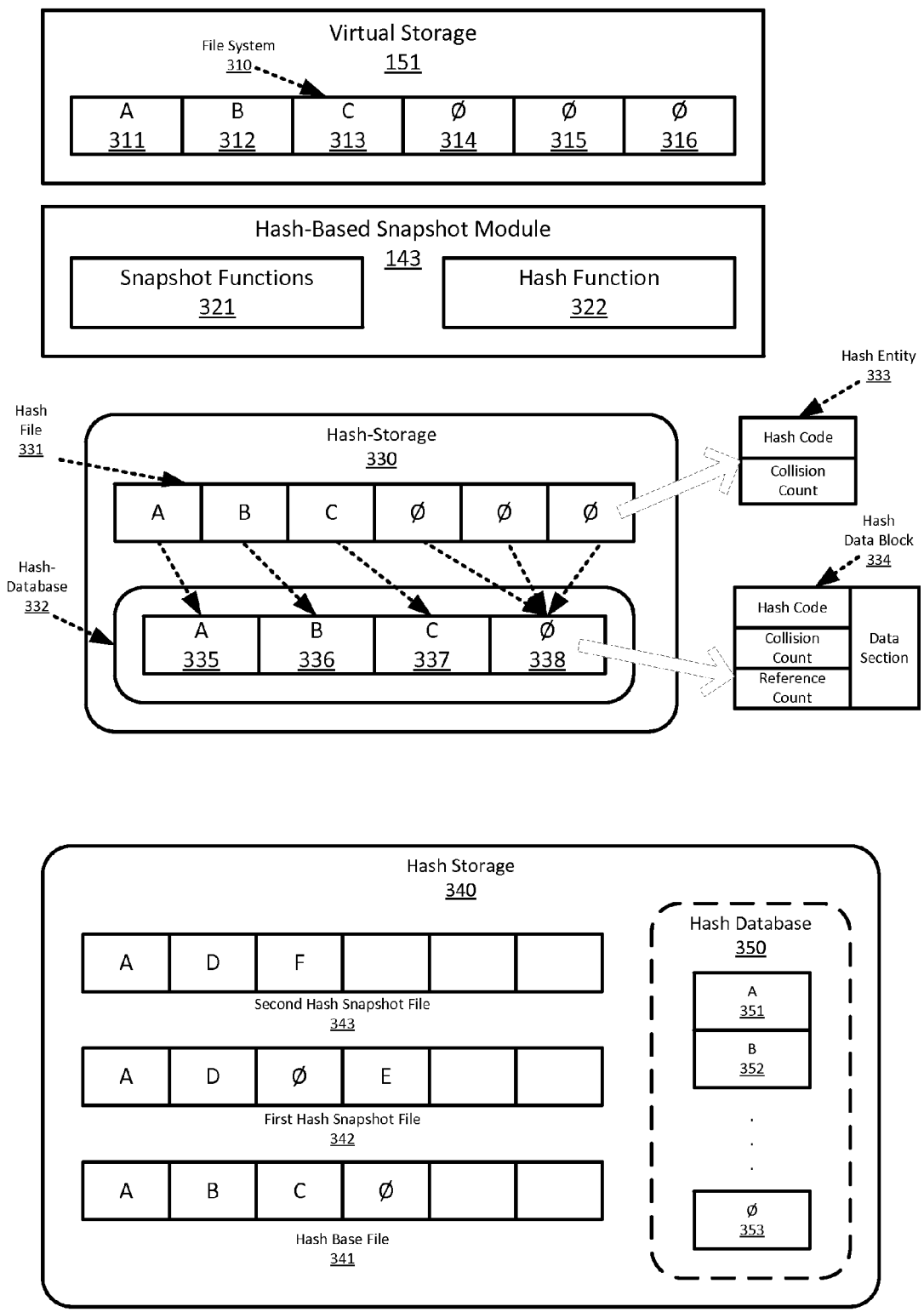
FIG. 3 illustrates internal structures of a hash-storage for supporting hash-based snapshots, according to one or more embodiments of the present disclosure.

FIG. 3 illustrates internal structures of a hash-storage for supporting hash-based snapshots, according to one or more embodiments of the present disclosure. In FIG. 3, the virtual storage 151 and the hash-based snapshot module 143 may correspond to their respective counterparts in FIG. 1. Referring back to FIG. 3, the virtual storage 151 may contain a file system 310 having a set of data blocks 311-316. The hash-based snapshot module 143 may provide hash-based snapshot services for the virtual storage 151 based on a hash-storage 330. The hash-storage 330 may contain one or more hash files 331, and one or more hash-databases 332.

In one embodiment, the set of data blocks 311-316 may be deemed "virtual data blocks" having "virtual addresses" supported by the hash-based snapshot module 143. When an operating system in a virtual machine (not shown in FIG. 3) requests to retrieve a specific data block (e.g., the data block 312) from the virtual storage 151, the operating system may transmit a read request to the hash-based snapshot module 143 with a "virtual address" that can be used to identify the data block 312 in the virtual storage 151. Once the hash-based snapshot module 143 retrieves the requested data from the hash-storage 330, it may return the requested data to the operating system as a response to the read request. Similarly, the operating system may request for the writing of a piece of data ("data-to-be-written") to a specific data block (e.g., data block 314). In this case, the operating system may transmit a write request to the hash-based snapshot module 143, with a virtual address for the data block 314 and the data-to-be-written to the hash-based snapshot module 143. Upon receiving the write request, the hash-based snapshot module 143 may perform its operations to store the data-to-be-written to the hash-storage 330 accordingly.

In one embodiment, the hash-based snapshot module 143 may be configured with, among other function blocks, a set of snapshot functions 321 and a hash function 322. The set of snapshot functions 321 may include, without limitation, retrieving data from a hash-storage, saving data to a hash-storage, creating snapshots, deleting snapshots, and collapsing snapshots. The hash function 322 may be configured to map data of variable length to a hash code with a fixed length. For example, the hash-based snapshot module 143 may generate a hash code by applying the hash function 322 to data stored in a data block (e.g., data block 313). The generated hash code may have a 128-bit length, and may be treated as a hashed format of the data block 313. In some situations, the hash function 322 may generate the same hash code for two or more distinct/different pieces of data. In these situations, the two or more distinct/different pieces of data may be deemed having a "collision" with respect to the hashing function 322. To distinguish these difference pieces of data, another identifier (e.g., an integer such as a collision count) may be utilized along with the hash code for distinctively identifying data that have collisions.

In one embodiment, the hash file 331 in the hash-storage 330 may be a hash base-file when the hash-storage 330 does not contain any snapshots. After one or more snapshots are created in the hash-storage 330, the hash file 331 may be one of the hash snapshot files. The hash file 331 may contain, among other components, a set of hash entities 333, each of which may include a "hash code" field and a "collision count" field. The "hash code" field may be a fixed-length (e.g., 128 bits) text field for storing the hash code generated by the hash function 322. The "collision field" field may be a fixed-length (e.g., 4 bytes) field for storing a collision count in a collision situation.

In one embodiment, the set of hash entities 333 may be associated with the set of data blocks 311-316 using the data block's virtual address as an association key. In this case, the set of hash entities 333 may have one-to-one association relationships with the set of data blocks 311-316, as each one of the hash entities 333 may be associated with one and only one of the data blocks 311-316, and each one of the data blocks 311-316 may be associated with one and only one of the hash entities in the hash file 331. In other words, hash-based snapshot module 143 may locate a specific hash entity in the hash file 331 by using a data block's virtual address. Alternatively, the set of hash entities 333 may be associated with the set of data blocks 311-316 using a data block's value as an association key.

In one embodiment, the hash-database 332 in the hash-storage 330 may contain, among other components, a set of hash data blocks 334. Each hash data block 334 may include, among other fields, a "hash code" field, a "collision count" field, a "reference count" field, and a "data section." The "hash code" field and the "collision count" field may be similarly defined as the corresponding fields of the hash entity 333. Thus, the set of hash entities 333 in the hash file 331 may be associated with the set of hash data blocks 334 based on the "hash code" field and the "collision count" field. In other words, a specific hash data block 334 may have one-to-many association relationships with one or more of the hash entities 333 that may be located in one or more hash files 331 in the hash-storage 330. That is, multiple hash entities 333, which contain identical "hash code" field and identical "collision count" field, may utilize a single hash data block 334 for storing data that is associated with the identical "hash code" and "collision count" fields. To track the association relationships with the hash entities 333, the "reference count" field of a specific hash data block 334 may be configured for storing a value representing a number of hash entities from the one or more hash files 331 that are associated with the specific hash data block 334. The "data section" field may be configured for storing data contained in one of the data blocks 311-316.

For example, for a data block 311 having a data value "A", the hash-based snapshot module 143 may utilize a virtual address of the data block 311 to locate a specific hash entity 333 in the hash file 331, and generate a hash code based on the data value "A." Subsequently, the hash-based snapshot module 143 may store the hash code in the "hash code" field of the hash entity 333, and create a hash data block 335 in the hash database 332. Afterward, the hash-based snapshot module 143 may store the hash code in the "hash code" field of the hash data block 335, and store the data value "A" in the "data section" field of the hash data block 335. In a no-collision situation, the hash-based snapshot module 143 may assign the "collision count" field of the specific hash entity 333 and the hash data block 335 with a value "1." Thus, the specific hash entity 333 may be associated with the hash data block 335, as indicated by a pointer in FIG. 3.

In one embodiment, the hash code generated by the hash-based snapshot module 143 may not be unique, as the hash function 322 may generated the same hash code for two different data values. In this case, the hash-based snapshot module 143 may utilize the "collision count" along with the hash code to differentiate and uniquely identify the different data values that are having a collision situation. For example, assuming the hash function 322 may generate the same hash code for the data blocks 312 and 313, which contain data values "B" and "C" respectively. In this case, the hash-based snapshot module 143 may assign two different collision counts to the hash entities that are associated with the data blocks 312 and 313. Therefore, a first hash entity 333 for the data block 312 may have a collision count "1", and a second hash entity for the data block 313 may have a collision count "2." Likewise, the hash-based snapshot module 143 may assign the two different collision counts "1" and "2" to the hash data blocks 336 and 337, respectively. Thus, even though the first hash entity and the second hash entity may have the same hash code, based on the different collusion counts, they are associated with different hash data blocks 336 and 337, as indicated by pointers in FIG. 3. Thus, the hash-based snapshot module 143 may utilize the hash code and the collision count to uniquely identify the data blocks 311-316.

In one embodiment, some of the data blocks 311-316 in the virtual storage 151 may contain identical or empty data values. For example, FIG. 3 shows three data blocks 314-316 having no data value. In this case, the "collision count" may have a value "0" since there is no collision. Thus, the hash-based snapshot module 143 may utilize a "reference count" field of the hash data block 334 to track those referencing one or more snapshot files that contain identical or empty data values. For example, the hash-based snapshot module 143 may assign a single hash data block 338 for associating with the empty data blocks. In other words, the single hash data block 338 may have a collision count value "0" and a "reference count" equaling to the number of empty data blocks in the hash file 331. When a previously empty data block is updated with value, the hash-based snapshot module 143 may create a new hash data block 334 in the hash-database 332 to store the updated value for the previously-empty data block.

In one embodiment, for a large snapshot file managing larger than 2 terabytes of empty data blocks, a hash data block 334's 4-byte reference count may overflow. In this case, the specific hash data block 338 may be permanently preserved, and the hash-based snapshot module 143 may stop increasing the "reference count" field of the hash data block 338 once there are more than 1 billion empty data blocks in the file system 310. Alternatively, the hash-based snapshot module 143 may assign a value "−1" to the reference count, indicating that the hash-based snapshot module 143 is no longer tracking the specific number of hash entities that are referencing the hash data bock 338.

In one embodiment, the hash-based snapshot module 143 may create a snapshot for the virtual storage 151 by making a copy of the hash file 331 without manipulating any of the "data sections" for the hash data blocks 334 stored in the hash-database 332. Specifically, a new hash file 331, which may be deemed a hash snapshot file for the newly created snapshot, may be generated by simply making a duplicate of an existing hash file 331 (e.g., a hash base-file or another hash snapshot file). Thus, there may be multiple hash files 331 in the hash-storage 330 with duplicated hash entities 333. In this case, the hash-based snapshot module 143 may use the "reference count" field in the hash data block 334 to track a number of hash entities from the multiple hash files 331 that are referencing the same hash data block 334. For example, after a new hash snapshot file is created, the hash-based snapshot module 143 may increment by one the "reference count" field of all the hash data blocks 334 in the hash-database 332 that are referenced by the duplicated hash entities in the newly created hash snapshot file.

In one embodiment, before any snapshot is created, the hash-storage 340 may contain a hash base file 341 generated based on the file system 310 in the virtual storage 151, and a hash-database 350 for supporting the data storage needs of the file system 310. The hash base file 341 may be considered a "baseline" snapshot file. And the hash-based snapshot module 143 may direct read and write requests to this baseline snapshot file. Afterward, the hash-based snapshot module 143 may create a first snapshot for the file system 310 by copying the hash base file 341 to a first hash snapshot file 342. Once the first snapshot is created, the hash-based snapshot module 143 may utilize the first hash snapshot file 342 for accessing the hash-database 350. Thus, the hash base-file 341 may be deemed preserving a "baseline" state of the file system 310, and any additional updates may be directed to the first snapshot and applied the first snapshot file 342. In the meantime, the baseline may be deemed a "parent" of the first snapshot. In other words, comparing to conventional snap-shotting approaches, in which a regular VM file is used when there is no snapshot created and a snapshot file is used only after a snapshot is created, the hash-based snapshot module 143 may perform its read/write mechanisms based on snapshot files associated with baseline or snapshots.

In one embodiment, in response to a write request to update a specific data block in the first snapshot (e.g., changing a specific data block's data value from "B" to "D"), the hash-based snapshot module 143 may apply the appropriate changes to the first hash snapshot file 342 and to the hash-database 350. For example, the hash-based snapshot module 143 may retrieve the value "D" from the hash database 350 utilizing the first hash snapshot file 342, while the value "B" may be stored in the hash database 350 and accessible via the hash base-file 341.

In one embodiment, the hash-based snapshot module 143 may create a second snapshot based on the first snapshot by copying the first hash snapshot file 342 to a second hash snapshot file 343. Afterward, additional update changes directed to the file system 310 may be recorded in the second hash snapshot file 343 and the hash database 350. Thus, the first hash snapshot file 342 may be deemed preserving a "first snapshot" state of the file system 310, and the first snapshot may be deemed a "parent" of the second snapshot. Further, additional snapshots may be created either based on the first snapshot, the second snapshot, and/or the baseline. Thus, multiple snapshots may be generated to form a hierarchical (tree line) snapshot structure.

Figure 4:
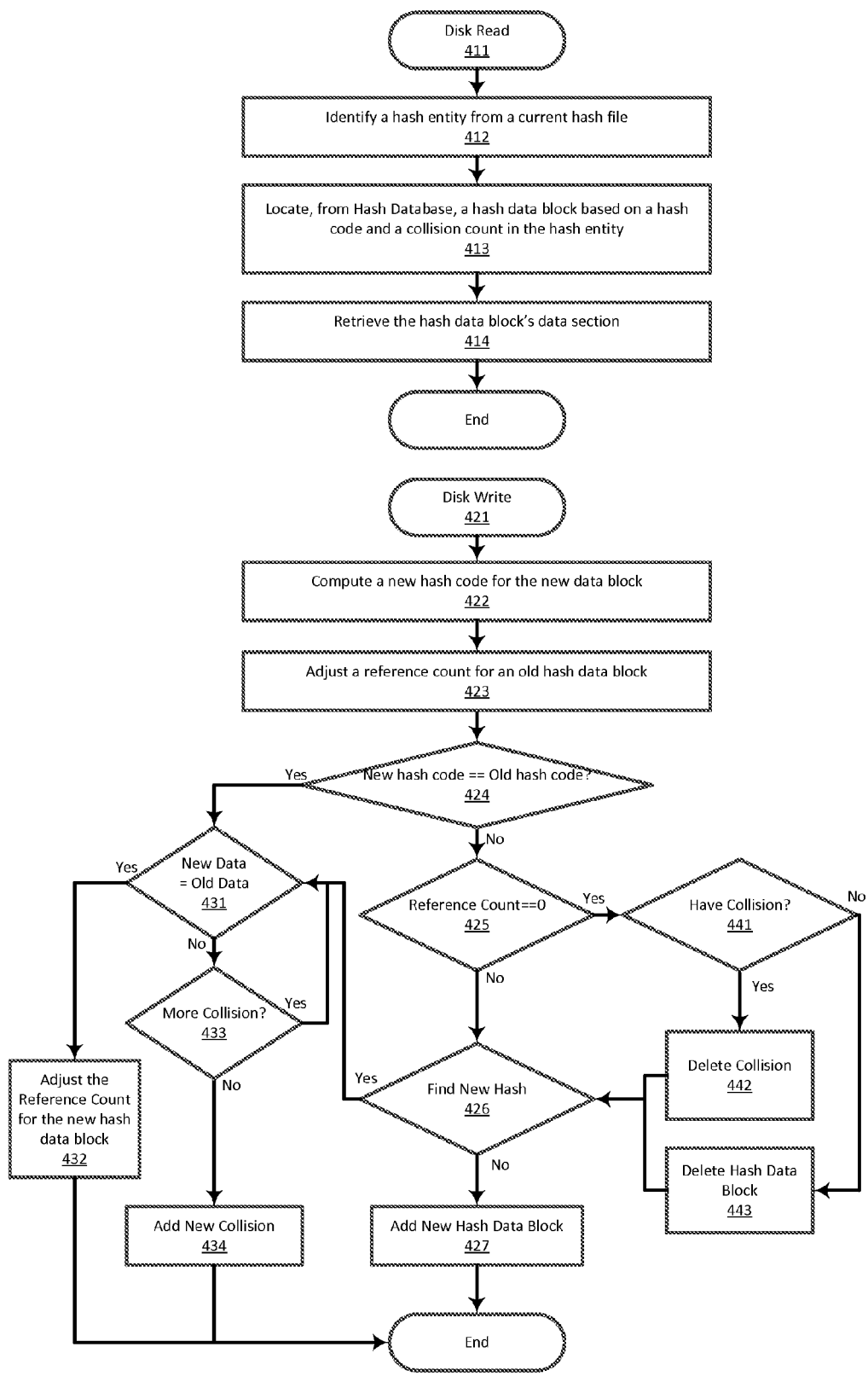
FIG. 4 shows multiple flow diagrams illustrating processes for accessing a hash-storage, according to one or more embodiments of the present disclosure.

FIG. 4 shows multiple flow diagrams illustrating processes for accessing a hash-storage, according to one or more embodiments of the present disclosure. The processes 411 and 421 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

In one embodiment, a hash-based snapshot module may perform the process 411 when a "disk read" request is received from an operating system for retrieving a data block from a virtual storage. The virtual storage may be supported by a hash-storage capable of storing data related to hash-based snapshots. Further, the disk read request (or "read request") may provide a virtual address for the specific data block in the virtual storage. At block 412, the hash-based snapshot module may determine whether there is a snapshot previously created in the hash-storage. If no snapshot exists in the hash-storage, the hash-based snapshot module may select a hash base-file as the "current hash file." If one or more snapshots are located in the hash-storage, the hash-based snapshot module may select the hash snapshot file for the latest-created snapshot as the "current hash file." Afterward, the hash-based snapshot module may identify a hash entity from the set of hash entities in the current hash file based on the virtual address of the specific data block.

At block 413, the hash-based snapshot module may extract a "hash code" and a "collision count" from the "hash entity" identified at block 412, and may use the "hash code" and the "collision count" to identify a specific hash data block from a hash-database of the hash-storage. The specific hash data block may be identified for having a "hash code" field and a "collision count" field that are identical to the corresponding fields in the hash entity. At block 414, the hash-based snapshot module may retrieve the "data section" from the specific hash data block, ad deliver the data section as a response to the disk read request and before the process 411 completes.

In one embodiment, the hash-based snapshot module may perform the process 421 when a "disk write" request is received for storing a set of data ("new data") to a specific data block in the virtual storage. The specific data block may be empty or contain "old data." The disk write request (or "write request") may further provide a virtual address for identifying the specific data block. At block 422, the hash-based snapshot module may computer a "new hash code" by applying a hash function to the "new data." At block 423, similar to the process 411 described above, the hash-based snapshot module may first utilize the virtual address to locate a "current hash file" and a specific hash entity in the current hash file that is associated with the virtual address. Subsequently, the hash-based snapshot module may identify a specific hash data block ("old hash data block") in the hash-database. Since the write request may empty the "old data" stored in the "old hash data block", the hash-based snapshot module may adjust (reduce) the "reference count" field of the "old hash data block." Thus, when the "old data" is no longer referenced by any hash files 331, the hash data block previously associated with the "old data" may be marked for removal, and may be removed from the hash-database 332 during a hash-database compacting process.

At block 424, the hash-based snapshot module may compare the "new hash code" with the "old hash code" stored in the "old hash data block." Upon a determination that the "new hash code" is identical to the "old hash code", the process 421 may proceed to block 431. Otherwise, the process 421 may proceed to block 425. In some situations, when the new hash code is equal to the old hash code, the "new data" may either be the same as the "old data", or the "new data" and the "old data" may have a collision situation with respect to a hashing function. Thus, at block 431, the hash-based snapshot module may compare the "new data" with the "old data." Upon a determination that the "new data" equals the "old data", the process 421 may proceed to block 432. Otherwise the process 421 may proceed to block 433.

At block 432, since the "new data" is identical to the "old data", the "old hash data block" may be deemed a "new hash data block" for the storing of "new data." Thus, the hash-based snapshot module may skip the creating the "new hash data block", and adjust (increment) the "reference count" of the "old hash data block", before complete its operations.

At block 433, the hash-based snapshot module may retrieve the hash entities having the "new hash code", and process each one of these hash entities to determine whether there is a collision situation. For each of the hash entities having a collision with the "new hash code", the process 421 may return back to block 431 to compare the data stored in the data block associated with the hash entity with the "new data." If there are more collisions, then the process 421 may proceed to block 434. At block 434, the hash-based snapshot module may create the "new hash data block" having a new "collision count", in order to differentiate the "new data" from the "old data." Afterward, the process 421 may terminate accordingly.

At block 425, the hash-based snapshot module may check whether the reference count for the "old hash data block" is zero. If the reference count is zero, then process 421 may proceed to blocks 441, 442, and 443, in which the hash-based snapshot module may delete/remove the "old hash data block" that is no longer referenced/needed by any hash entities. Otherwise, process 421 may proceed to block 426.

At block 441, the hash-based snapshot module may evaluate whether the "old hash data block" has different "collision-versions" of hash data blocks. In other words, there may be other hash data blocks in the hash-database that have the same hash-code but different collision counts comparing to the "old hash data block." If there are other collision-versions of the hash data blocks, the process 421 may proceed to block 442, in which the hash-based snapshot module may remove the "old hash data block" which contains the specific collision-version of the data, and preserve the "hash code" in the hash-database. Otherwise, the process 421 may proceed to block 443, in which the hash-based snapshot module may remove the "old hash data block" and the "hash code" from the hash-database.

After the "old hash data block" is deleted from the hash-database, the process 421 may proceed to block 426. At this point, the hash-based snapshot module may evaluate whether the "new data" already "exists" in the hash-database. The "new data" may be deemed "exist" in the hash-database when one or more hash data blocks in the hash-database share the same "hash code" as the "new data." In this case, the process 421 may proceed to block 431 to either add a new collision at block 434 or adjust the reference count at block 432. If the "new data" does not exist in the hash-database, the process 421 may proceed to block 427, in which the hash-based snapshot module may create a "new hash data block" for storing the "new data." The hash-based snapshot module may also populate the "new hash data block" with the appropriate hash code, collision count, and reference count values.

Figure 5:
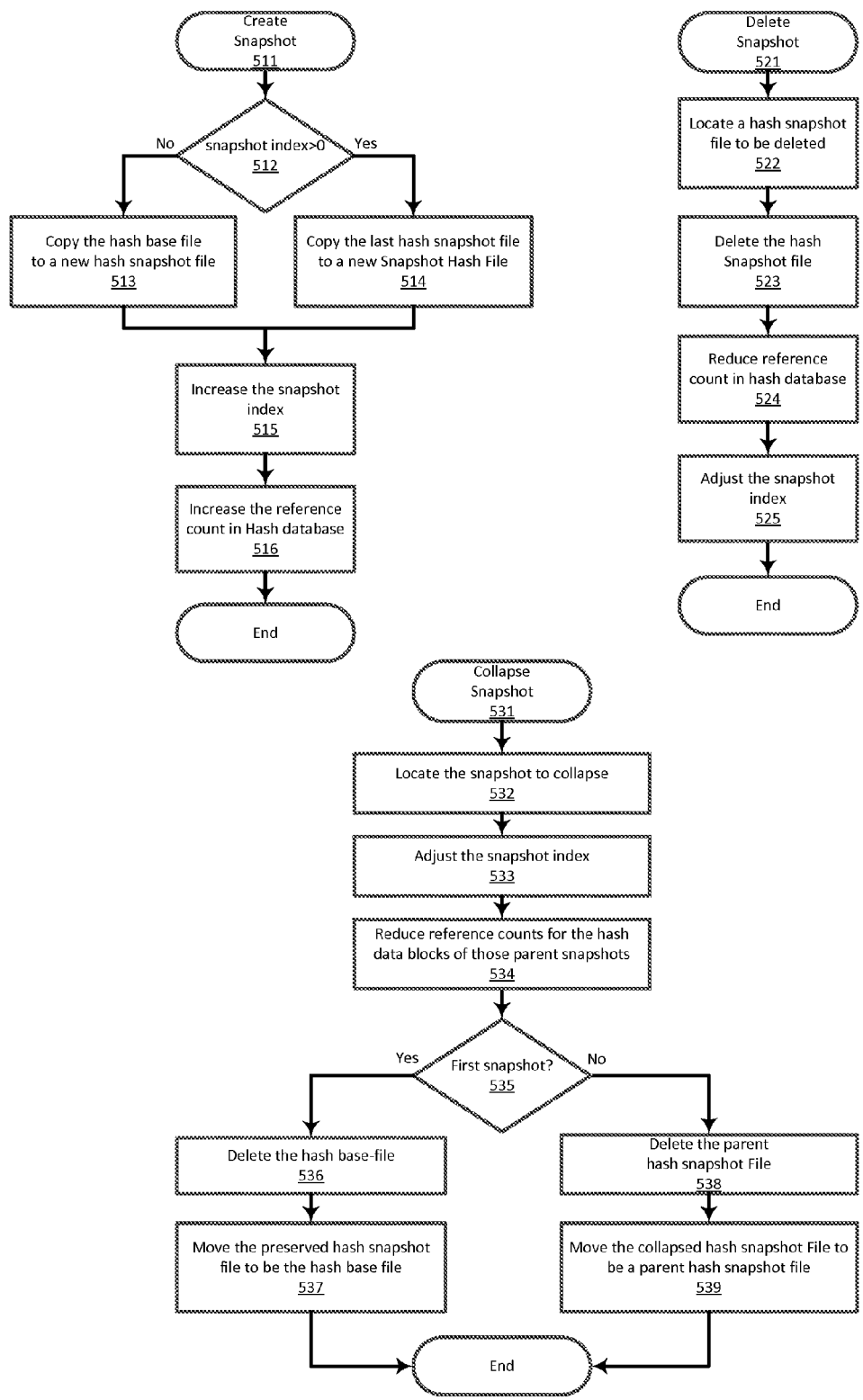
FIG. 5 shows multiple flow diagrams illustrating processes for managing hash based snapshots, according to one or more embodiments of the present disclosure.

FIG. 5 shows multiple flow diagrams illustrating processes for managing hash-based snapshots, according to one or more embodiments of the present disclosure. The processes 511, 521, and 531 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

In one embodiment, a hash-based snapshot module may perform the process 511 to create a new snapshot for a file system located in a virtual storage. The virtual storage may be supported by a hash-storage having a hash-database. At block 512, the hash-based snapshot module may check a "snapshot index" in the hash-storage, which stores a value indicating a number of snapshots that have been previously created in the hash-storage. If the "snapshot index" is equal to "0", the process 511 may proceed to block 513, in which the hash-based snapshot module may make a copy of the hash base-file as a new hash snapshot file for the new snapshot. If the "snapshot index" is larger than "0", meaning there is at least one snapshot created in the hash-storage, the process 511 may proceed to block 514, in which the hash-based snapshot module may make a copy of the "last" hash snapshot file as a new hash snapshot file for the new snapshot. The "last" hash snapshot file in the hash-storage may be the one assigned with the highest "snapshot index." Once completed their operations, block 513 and block 514 may proceed to block 515.

At block 515, the hash-based snapshot module may increment the "snapshot index" by one indicating that a new snapshot is added to the hash-storage. At block 516, for those hash data blocks in the hash-database that are referenced by one or more of the hash entities of the new hash snapshot file, the hash-based snapshot module may increment the reference count field of those hash data blocks by one. Afterward, process 511 may be deemed completed in creating a new snapshot.

In one embodiment, the hash-based snapshot module may perform the process 521 to delete a snapshot from a hash-storage. At block 522, the hash-based snapshot module may locate a hash snapshot file that is associated with the snapshot to be deleted. To delete the latest snapshot, the hash-based snapshot module may locate the "snapshot index", and identify the hash snapshot file that corresponds to the current "snapshot index." Alternatively, the hash-based snapshot module may delete an early-created snapshot. For example, assuming there are three snapshots (e.g., "001", "002", and "003") in the hash-storage, and the "snapshot index" has a value of "3." To delete the latest snapshot, the hash-based snapshot module may utilize the "snapshot index" to identify this latest snapshot being the snapshot "003." Alternatively, the hash-based snapshot module may be instructed to delete snapshot "002", even though a later-created snapshot "003" exists in the hash-storage.

At block 523, the hash-based snapshot module may remove the hash snapshot file that is identified at block 522. At block 524, for those hash data blocks in the hash-database that are referenced by one or more of the hash entities of the deleted hash snapshot file, the hash-based snapshot module may reduce the reference count field of those hash data blocks by one. At block 525, the hash-based snapshot module may optionally adjust the "snapshot index" if the deleted snapshot is the "latest" snapshot (e.g., snapshot "003"). Thus, the snapshot index may be reduced by one (e.g., from "3" to "2"), so that a subsequently created snapshot may reuse the snapshot index value and being identified as "003." Afterward, process 521 may be deemed completed the snapshot deletion operation.

In one embodiment, the hash-based snapshot module may utilize the process 531 to perform a collapse operation for a specific snapshot (collapse-snapshot) in the hash-storage. At block 532, the hash-based snapshot module may locate the "collapsed-snapshot" based on the "snapshot index" or identified in the collapse operation. At block 533, the hash-based snapshot module may adjust the snapshot index in the hash-storage, similar to the operations performed at block 525. After adjustment, the snapshot index may be reduced by one if the collapse-snapshot is the latest-created snapshot in the hash-storage. At block 534, the hash-based snapshot module may reduce reference counts for those hash data blocks that are referenced by the hash entities in the collapsed-snapshot.

At block 535, the hash-based snapshot module may determine whether the collapse-snapshot is the first snapshot in the hash-storage. When the collapse-snapshot is the first snapshot, the process 531 may proceed to block 536. Otherwise, the process 531 may proceed to block 538. At block 536, the hash-based snapshot module may delete the hash base-file without updating any "data sections" in the hash-database. At block 537, the hash-based snapshot module may move the hash snapshot file for the collapse-snapshot to be the hash base-file.

At block 538, the hash-based snapshot module may delete the hash snapshot file for a parent snapshot of the collapse-snapshot. At block 539, the hash-based snapshot module may move the collapse-snapshot's hash snapshot file to be the parent snapshot's hash snapshot file. Thus, the original collapse-snapshot effectively becomes the new baseline or the new parent snapshot of the collapse-snapshot. Afterward, the process 531 may be deemed completed in performing a snapshot collapse operation.

For example, the hash-storage may have three snapshots ("001", "002", "003"). Thus, collapsing snapshot "003" may include a first operation to decrease the reference counts for those hash data blocks in the hash-database that are referenced by the hash snapshot file for the snapshot "002", a second operation to remove the hash snapshot file for the snapshot "002", and a third operation to rename the hash snapshot file for the snapshot "003" to be the hash snapshot file for the snapshot "002." Afterward, the hash-storage may contain two snapshots ("001 and "002"), with the original snapshot "002" being removed and the original snapshot "003" becoming the new snapshot "002". In another example, the hash-storage may have a single snapshot ("001"). In this case, collapsing the snapshot "001" may involve the decreasing of the reference counts for hash data blocks referenced by the hash base-file, the deleting of the hash base-file, and the converting of the hash snapshot file for the snapshot "001" to the hash base-file. Afterward, the hash-storage contains no more snapshot.

Figure 6:
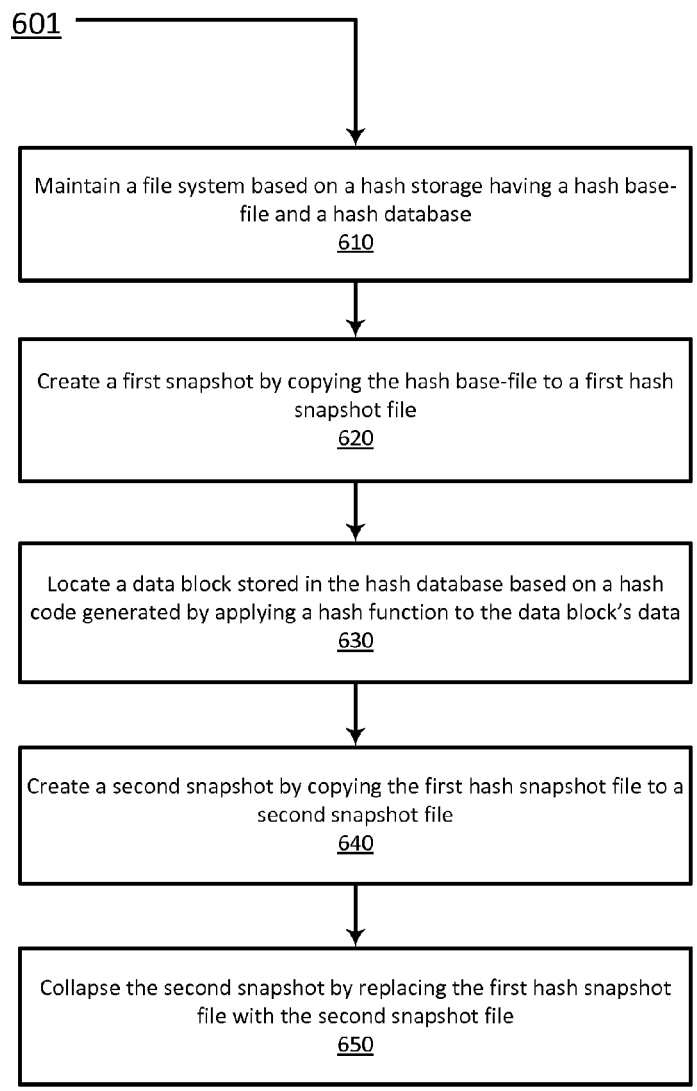
FIG. 6 shows a flow diagram illustrating one example process for providing hash-based snapshot services, according to one or more embodiments of the present disclosure.

FIG. 6 shows a flow diagram illustrating one example process 601 for providing hash-based snapshot services, according to one or more embodiments of the present disclosure. The process 601 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 6 may be practiced in various implementations.

At block 610, a hash-based snapshot module executing in a virtualized environment may be configured to provide hash-based snapshot services for a virtual storage. The hash-based snapshot module may maintain a file system located in the virtual storage. In one embodiment, the file system may be associated with a plurality of data blocks, and the virtual storage may be supported by a hash-storage having a hash base-file and a hash-database. Further, the hash-database may be configured for storing the plurality of data blocks, and the hash base-file may contain hash codes generated by applying a hash function to the plurality of data blocks. The hash-based snapshot module may access the file system using hash codes contained in the hash base-file to identify data blocks stored in the hash-database.

At block 620, the hash-based snapshot module may create a first snapshot for the file system. The first snapshot may be associated with a first hash snapshot file, and the hash-based snapshot module may create the first snapshot by copying the hash base-file to a first hash snapshot file and storing the first hash snapshot file to the hash-storage. In one embodiment, the first hash snapshot file contains a first plurality of hash entities each of which is associated with a corresponding one of the plurality of data blocks, and the hash-database contains a plurality of hash data blocks. During the creation of the first snapshot, for each hash data block in the plurality of hash data blocks that is referenced by one of the first plurality of hash entities, the hash-based snapshot module may increment the hash data block's associated reference count by one.

At block 630, the hash-based snapshot module may access the first snapshot using hash codes contained in the first hash snapshot file to identify data blocks stored in the hash-database. Specifically, in response to a read request to retrieve a first data block from the first snapshot, the hash-based snapshot module may locate a first hash entity from the first plurality of hash entities based on the first data block's address, and locate the first data block in the hash-database based on a first hash code and a first collision count retrieved from the first hash entity.

Further, in response to an update request to write a second data block to the first snapshot, the hash-based snapshot module may locate a second hash entity from the first plurality of hash entities based on the second data block's address. Further, the hash-based snapshot module may generate a second hash code for the second hash entity by applying the hash function to the second data block's data, and generate a second collision count for the second hash entity based on a number of data blocks stored in the hash-database having corresponding hash codes that are identical to the second hash code. Afterward, the hash-based snapshot module may store the second data block along with the second hash code and the second collision count in the hash-database. In one embodiment, the hash-based snapshot module may store a reference count with the second data block in the hash-database, while the reference count is generated based on a number of data blocks stored in the hash-database that have identical data as the second data block.

At block 640, the hash-based snapshot module may create a second snapshot based on the first snapshot. The second snapshot may be associated with a second hash snapshot file, and the hash-based snapshot module may create the second snapshot by copying the first hash snapshot file to a second hash snapshot file and storing the second hash snapshot file to the hash-storage. The second hash snapshot file may contain a second plurality of hash entities. During the creating of the second snapshot, for each hash data block in the plurality of hash data blocks that is referenced by one of the second plurality of hash entities, the hash-based snapshot module may increment the hash data block's associated reference count by one. Afterward, the hash-based snapshot module may access the second snapshot using hash codes contained in the second hash snapshot file to identify data blocks stored in the hash-database.

In one embodiment, the hash-based snapshot module may delete the second snapshot by removing the second hash snapshot file from the hash-storage. During the deleting of the second snapshot, for each hash data block in the plurality of hash data blocks that is referenced by one of the second plurality of hash entities, the hash-based snapshot module may reduce the hash data block's associated reference count by one.

At block 650, when there are more than one snapshot in the hash-storage, the hash-based snapshot module may collapse the first snapshot by replacing the first hash snapshot file with the second hash snapshot file. Further, for each hash data block in the plurality of hash data blocks that is referenced by one of the first plurality of hash entities, the hash-based snapshot module may reduce the hash data block's associated reference count by one. Afterward, the hash-based snapshot module may access the first snapshot via the replaced first hash snapshot file.

In one embodiment, when there is one snapshot in the hash-storage, the hash-based snapshot module may collapse the hash-storage by replacing the hash base-file with the first hash snapshot file. Further, for each hash data block in the plurality of hash data blocks that is referenced by one of the plurality of hash entities, the hash-based snapshot module may reduce the hash data block's associated reference count by one.

Thus, systems and methods for providing hash-based snapshot services have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable storage medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system configured to provide hash-based snapshot services for a virtual storage, the system comprising a processor and memory coupled with the processor, wherein the memory is configured to provide the processor with instructions for maintaining, by a hash-based snapshot module executing on the system, a file system of the virtual storage, wherein the file system is associated with a plurality of data blocks, the virtual storage is supported by a hash-storage having a hash base-file and a hash-database, the hash-database is configured for storing the plurality of data blocks, and the hash base-file includes hash codes generated by applying a hash function to the plurality of data blocks;

accessing, by the hash-based snapshot module, the file system using hash codes contained in the hash base-file to identify corresponding data blocks stored in the hash-database;

creating, by the hash-based snapshot module, a first snapshot for the file system, wherein the first snapshot is associated with a first hash snapshot file copied based on the hash base-file wherein the first hash snapshot file contains a first plurality of hash entities each of which is associated with a corresponding one of the plurality of data blocks;

accessing, by the hash-based snapshot module, the first snapshot using hash codes contained in the first hash snapshot file to identify corresponding data blocks stored in the hash-database;

in response to a read request to retrieve a first data block from the first snapshot locating a first hash entity from the first plurality of hash entities based on the first data block's address and locating the first data block in the hash-database based on a first hash code and a first collision count retrieved from the first hash entity; and in response to an update request to write a second data block to the first snapshot, locating a second hash entity from the first plurality of hash entities based on the second data block's address, generating a second hash code for the second hash entity by applying the hash function to the second data block's data, generating a second collision count for the second hash entity based on a number of data blocks stored in the hash-database having corresponding hash codes that are identical to the second hash code and storing the second data block along with the second hash code and the second collision count in the hash-database.

2. The system of claim 1, wherein accessing the first snapshot further comprises:

storing a reference count with the second data block in the hash-database, wherein the reference count is generated based on a number of data blocks stored in the hash-database that have identical data as the second data block.

3. The system of claim 1, wherein the hash-database contains a plurality of hash data blocks, and creating the first snapshot comprises:

for each hash data block in the plurality of hash data blocks that is referenced by one of the first plurality of hash entities, incrementing the hash data block's associated reference count by one.

4. The system of claim 1, wherein the memory is further configured to provide the processor with instructions for creating a second snapshot based on the first snapshot, wherein the second snapshot is associated with a second hash snapshot file copied based on the first hash snapshot file; and accessing the second snapshot using hash codes contained in the second hash snapshot file to identify corresponding data blocks stored in the hash-database.

5. The system of claim 4, wherein the second hash snapshot file contains a second plurality of hash entities, the hash-database contains a plurality of hash data blocks, and creating the second snapshot comprises:

for each hash data block in the plurality of hash data blocks that is referenced by one of the second plurality of hash entities, incrementing the hash data block's associated reference count by one.

6. The system of claim 4, wherein the second hash snapshot file contains a second plurality of hash entities, the hash-database contains a plurality of hash data blocks, and the memory is further configured to
provide the processor with instructions for deleting the second snapshot by removing the second hash snapshot file; and
for each hash data block in the plurality of hash data blocks that is referenced by one of the second plurality of hash entities, reducing the hash data block's associated reference count by one.

7. The system of claim 4, wherein the first hash snapshot file contains a first plurality of hash entities, the hash-database contains a plurality of hash data blocks, and the memory is further configured to
provide the processor with instructions for collapsing the first snapshot by replacing the first hash snapshot file with the second hash snapshot file; for each hash data block in the plurality of hash data blocks that is referenced by one of the first plurality of hash entities, reducing the hash data block's associated reference count by one; and
accessing the first snapshot via the replaced first hash snapshot file.

8. The system of claim 1, wherein the hash base-file contains a plurality of hash entities, the hash-database contains a plurality of hash data blocks, and the memory is further configured to
provide the processor with instructions for collapsing the hash-storage by replacing the hash base-file with the first hash snapshot file; for each hash data block in the plurality of hash data blocks that is referenced by one of the plurality of hash entities,
reducing the hash data block's associated reference count by one; and
accessing the file system via the replaced hash base-file.

9. A system configured to provide hash-based snapshot services for a virtual storage, the system comprising a processor and memory coupled with the processor, and the system further comprising:
a hash-based snapshot module coupled with the processor and the memory, wherein the hash-based snapshot module is configured to maintain a file system located in the virtual storage, and the file system is associated with a plurality of data blocks; and
a hash-storage coupled with the hash-based snapshot module and configured for storing a hash base-file and a hash-database, wherein the hash-database is configured for storing the plurality of data blocks, and the hash base-file includes hash codes generated by applying a hash function to the plurality of data blocks,
wherein the hash-based snapshot module is further configured to access the file system using hash codes contained in the hash base-file to identify corresponding data blocks stored in the hash-database, create a snapshot for the file system by copying the hash base-file to a hash snapshot file wherein the hash snapshot file is configured with a plurality of hash entities each of which is associated with a corresponding one of the plurality of data blocks, store the hash snapshot file to the hash-storage wherein the hash-storage is configured with a plurality of hash data blocks and access the snapshot using hash codes contained in the hash snapshot file to identify corresponding data blocks stored in the hash-database,
wherein, in response to a read request to retrieve a first data block from the snapshot, the hash-based snapshot module is further configured to locate a first hash entity from the plurality of hash entities based on the first data block's address, locate a first hash data block from the plurality of hash data blocks based on a first hash code and a first collision count stored in the first hash entity, wherein the first hash code is generated by applying the hash function to the first data block's data, and retrieve the first data block from the first hash data block.

10. The system as recited in claim 9, wherein
in response to an update request to write a second data block to the first snapshot, the hash-based snapshot module is further configured to
locate a second hash entity from the plurality of hash entities based on the second data block's address,
generate a second hash code for the second hash entity by applying the hash function to the second data block's data,
locate a second hash data block from the plurality of hash data blocks based on the second hash code, and
store the second hash code and the second data block in the second hash data block.

11. The system as recited in claim 10, wherein the hash-based snapshot module is further configured to
generate a collision count for the second hash entity by incrementing by one a number of hash data blocks in the hash-database having corresponding hash codes that are identical to the second hash code, wherein the second hash code and the collision count are configured for uniquely identifying the second data block's data; and
store the collision count in the second hash data block.

12. The system as recited in claim 11, wherein the hash-based snapshot module is further configured to
increment a reference count for the second hash data block, wherein the reference count is configured for counting a number of times the hash data block is referenced by the plurality of data blocks and by one or more snapshots.

13. A non-transitory computer-readable storage medium, containing a set of instructions which, when executed by a processor, cause the processor to perform a method for providing hash-based snapshot services for a virtual storage, the method comprising:
maintaining, by a hash-based snapshot module executing on the system, a file system located in the virtual storage, wherein
the file system is associated with a plurality of data blocks,
the virtual storage is supported by a hash-storage having a hash base-file and a hash-database,
the hash-database is configured for storing the plurality of data blocks, and
the hash base-file is configured for accessing the stored plurality of data blocks in the hash-database based on hash codes generated by applying a hash function to the plurality of data blocks;
creating, by the hash-based snapshot module, a first snapshot for the file system by copying the hash base-file to a first hash snapshot file and storing the first hash snapshot file to the hash-storage;
accessing, by the hash-based snapshot module, the first snapshot via the first hash snapshot file;
creating a second snapshot based on the first snapshot by copying the first hash snapshot file to a second hash snapshot file and storing the second hash snapshot file to the hash-storage; and
accessing the second snapshot via the second hash snapshot file.

14. The non-transitory computer-readable storage medium as recited in claim 13, wherein the method further comprises:
   collapsing the first snapshot by replacing the first hash snapshot file with the second hash snapshot file; and
   accessing the first snapshot via the replaced first hash snapshot file.

15. The non-transitory computer-readable storage medium as recited in claim 13, wherein the method further comprises:
   collapsing the hash-storage by replacing the hash base-file with the first hash snapshot file; and
   accessing the file system via the replaced hash base-file.

* * * * *